United States Patent Office 2,877,911
Patented Mar. 17, 1959

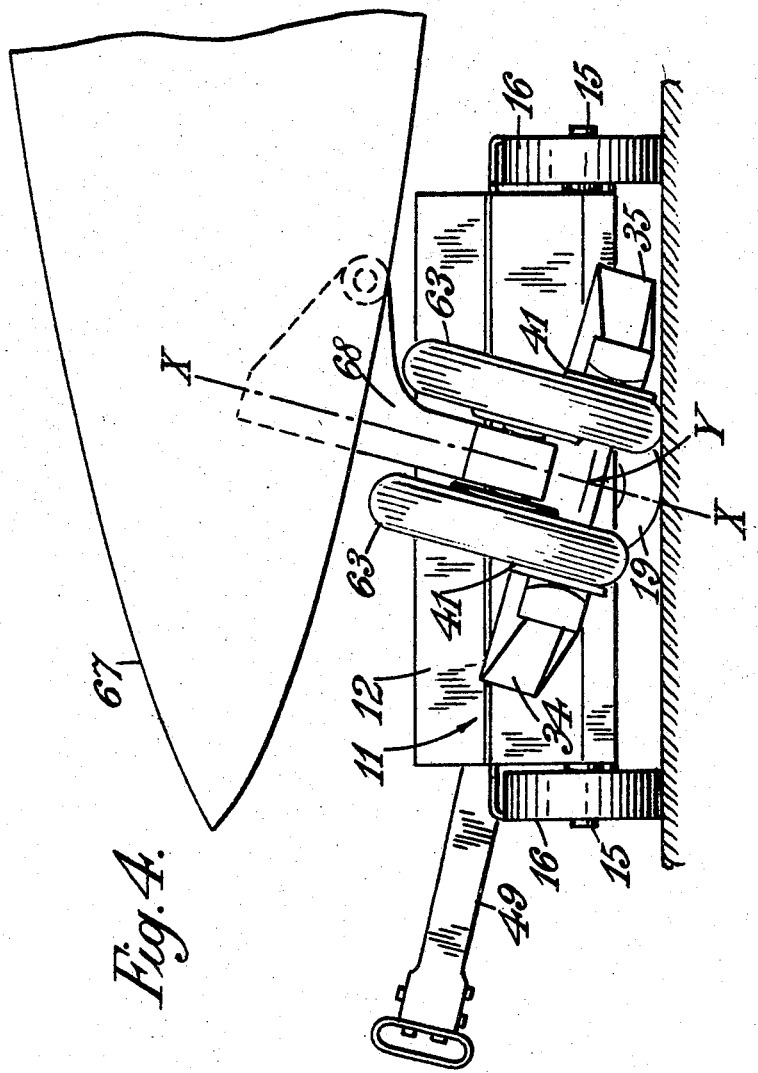

2,877,911

TRUCKS FOR HANDLING AIRCRAFT

Alfred Erwin Reginald Arnot, Basingstoke, England, assignor to John Reginald Sharp and Emmanuel Kaye, Basingstoke, England Application November 3, 1955, Serial No. 544,780

Claims priority, application Great Britain November 5, 1954

4 Claims. (Cl. 214—332)

This invention comprises improvements in or relating to trucks for handling aircraft.

It is known to provide a truck for handling aircraft which comprises a device to lift a tail or nose wheel of the undercarriage off the ground so that it is carried by the truck and a power operated steering wheel on the truck, so that the aircraft can be maneuvered on the ground by steering the truck about in relation to the undercarriage. In such a device the truck has hitherto been provided with means for holding the aircraft whereby it can assume various angles relative to the fuselage of the aircraft. It is one object of the present invention to provide a more satisfactory device for accomplishing the lifting of the part of the aircraft which it engages. The invention is not however limited to devices with power driven wheels.

According to the present invention an aircraft handling device comprises a chassis, lateral ground wheels at one end of the chassis and between the ground wheels a device for gripping and lifting a wheel of an aircraft undercarriage which takes the form of two arms extending forwardly from the chassis, side by side close to the ground and having grippers at their front ends, means to draw the arms firmly together so that the grippers engage an aircraft tire or wheel or its equivalent near the ground and means to lift the gripper arms bodily with the wheel relatively to the chassis.

The grippers may consist of pad members having frictional gripping devices which are pivoted to the front ends of the arms so as to cause them to bear evenly on the part which they engage.

The gripper arms, for the purpose of enabling the lifting operating to be accomplished, may be mounted on a pivoted block which is supported on a horizontal axis on the chassis so that the arms can be tipped up at the front end by tilting the block by an appropriate hydraulic jack or its equivalent. Furthermore, the gripper arm mounting may comprise a second pivotal axis which is longitudinal, that is to say, extends fore and aft the truck, so that when the truck is turned around on the ground the gripper arms can adapt themselves to any caster angle of the steering column of the undercarriage of the aircraft.

The following is a description by way of example of one construction in accordance with the invention:

In the accompanying drawings,

Figure 4 is an end elevation of the truck in another position in relation to an undercarriage.

Figure 2:
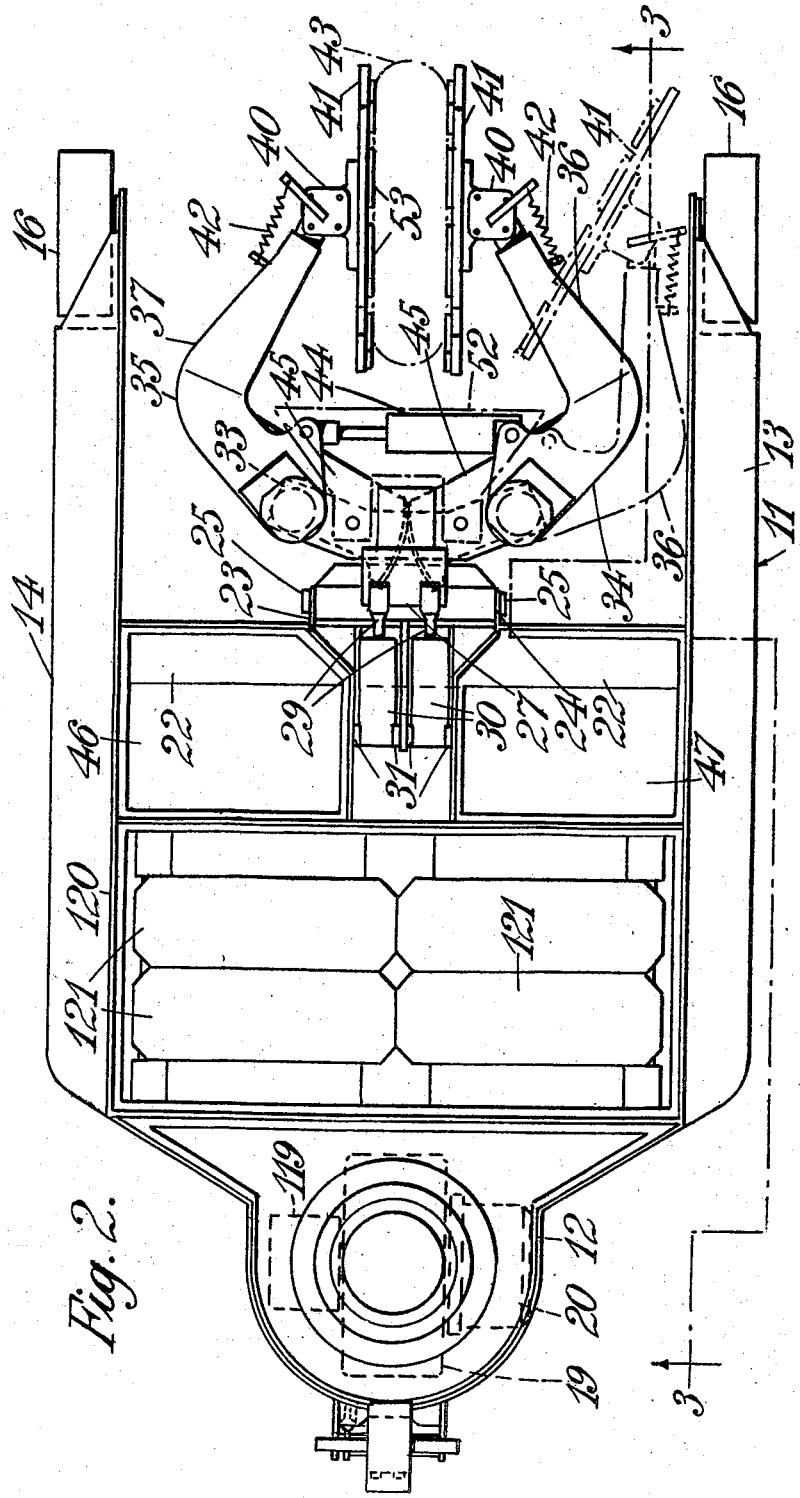
Figure 2 is a plan of the truck with certain cover plates removed.
Figure 3:
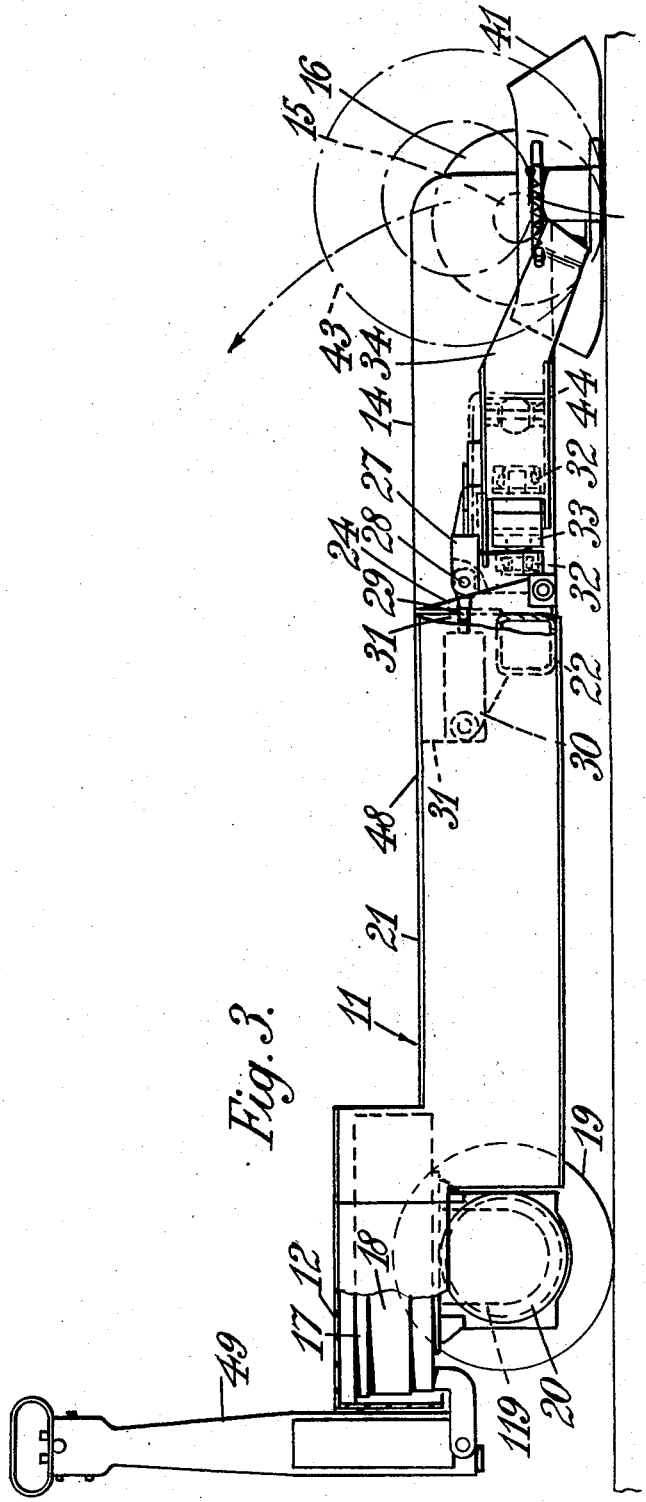
Figure 3 is a vertical section upon the line 3—3 of Figure 2.

A truck is provided comprising a low built chassis 11 having a rear portion 12 which extends transversely across the truck and carries a turntable mounting (17, Figure 3), and forwardly extending lateral side members 13, 14 of the chassis which are well spaced apart from one another and carry at their front ends stub axles 15 projecting outwardly, on which ground wheels 16 are mounted. The turntable mounting 17 supports a turntable 18 having a steering wheel 19 to rest on the ground which may if desired be provided with an electric or other motor 20 for driving the wheel. The turntable 18 supports the wheel 19 by means of a downwardly projecting bracket 119 which carries a stub axle for the wheel, and the motor 20 is overhung from the wheel on the other side and is connected to drive the wheel by internal reduction gearing. In the case of an electric motor, the chassis carries a casing 120 to house a suitable power battery 121. The cover 21 over the battery is shown removed in Figure 2. The wheel construction is built so as to keep as close to the ground as possible and the side members 13, 14 of the chassis are made suitably rigid of box construction. The transverse portion of the chassis includes a transverse box member 22 rigidly uniting the side members 13, 14 together.

Forwardly projecting from the transverse box member 22 between its points of union with the forwardly projecting side members, are two strong ears 23, 24 in which are pivoted the ends of a tubular shaft 25 which forms the basis for a tilting assembly. In the center of the tubular shaft there is welded to it a forwardly projecting block 27 which, as viewed in side elevation, extends upwardly from the cross shaft 25 and has at its upper rear corner a pivotal connection 28 to the rams 29 of a pair of hydraulic lifting jacks 30. The hydraulic lifting jacks 30 are located above the box-like cross member 22 and pivoted between ears 31 standing up therefrom near the center. The jacks can therefore tilt the block 27 up or down by being contracted or expanded. In the block 27 are two thrust resisting taper roller bearings 32 which are in line with one another in a fore and aft direction and which support a cross block or yoke 33 which works in a cut out portion in the middle of the tilting block 27 and extends out therefrom on each side. The yoke 33 carries at each end a bore which extends vertically in the lowermost gripping position of the parts and which contains roller bearings, capable of resisting thrust, for holding gripper arms 34, 35 which extend forwardly and downwardly. The vertical bores for the bearings in yoke 33 ensures that the gripper arms 34, 35 will move horizontally across the ground. The gripper arms 34, 35 extend forwardly until at their front ends they are just clear of the ground and lie approximately in the same vertical plane as the axis of the truck sidewheels 16. As viewed in plan (Figure 2) the gripper arms 34, 35 are bent at their middle, the first portion near the hinges on the block 33 extending forwardly in an inclined direction so that they become wider apart as they go forward and the front portions 36, 37 being recurved toward each other so as to be nearly parallel with the side members of the chassis between which they lie when moved out to the chain line position shown in Figure 2.

The longitudinally disposed taper roller bearings 32 permit the gripper arms to cant sideways which enables them to adapt themselves to the caster angle of the steering column 38 of an aircraft undercarriage, such as is shown in the drawing, if the truck is moved around such axis by rotating the wheel 19 to a position at right angles to that shown in the drawing and propelled by motor 20.

At the front end each gripper arm carries a hinge 40 for a gripper pad 41. The center of the back of each gripper pad is pivoted at the hinge and there is a light spring connection 42 between the gripper pad and the arm which carries it so as to keep it normally in an open V position in which the open end of the V is arranged to guide the entry of the aircraft wheel 43. Closure of the gripper arms easily overcomes the springs 42 so that the pads 41 press against the generally parallel sides of the wheel or tire 43.

The two gripper arms are interconnected just in front of their hinges on the block 33 by a hydraulic jack 44, contraction of which will draw them together. The gripper arms are connected together by means which ensures that they both move through an equal angle. To this end a gear sector 45 is provided on each arm near its hinge on the block 33, the two geared sectors meshing together.

While the gripper arms normally extend downwardly and forwardly, the pads 41 which they carry normally extend parallel with the ground and their inner surfaces are covered with pads 45 of frictional or compressible material, such as wire-mesh or rubber, and may be shaped with a hollow to fit the sides of a loaded aircraft undercarriage tire.

In operation, the truck is maneuvered with the gripper arms widely separated and just above the ground so that the gripper arms lie one to each side of the undercarriage wheel which is to be lifted. The cross jack 44 is then contracted so as to draw the gripper arms together and cause the pads to grip the aircraft tire firmly. As the gripper arms are geared together to turn through equal angles, they keep themselves centered with the truck. If the truck has not been exactly centered with the wheel of the aircraft when approaching it, owing to the relatively light weight of the truck and the fact that it is unloaded when the gripper arms are engaging the aircraft wheel, it will skid sideways over the ground under the action of the grippers, and center itself. After the tire has been securely gripped the pivoted block 33 on which the gripper arms are mounted is tilted up by jack 30 and this lifts the aircraft wheel clear of the ground, while keeping it between the ground wheels 16, 16 on the side members 13, 14 of the chassis. Thereafter by operating the power steering wheel 19 of the truck, the aircraft can be maneuvered as desired.

It is desirable as a safety feature to ensure that the gripper arms 34, once they have gripped the wheel 43, cannot be relaxed until the load has been redeposited on the ground. This can be conveniently achieved by putting a pressure operated switch in the hydraulic connection to the lifting jack 30 and providing an electrical control circuit associated therewith such that the jack 44 which operates the clamp cannot be released until the pressure in the lifting jack 30 is reduced to that corresponding to no load. Such a circuit may contain also limit switches operated by the lifting and clamping jacks and the limit switches may be adjustable to suit operation on differing aircraft. A relief valve may be provided in the circuit to the clamping jack to limit the pressure in this jack to one that ensures adequate but not excessive gripping force on the grippers. Such relief valve must be adjustable to suit various aircraft or alternatively there may be several such valves, each calibrated to operate at a different pressure in combination with electrically operated valves under the control of the operator so that he can select which of the valves is in operation at a given time.

The chassis comprises two compartments 46, 47 in front of the battery which are covered over in use by cover plate 48 and which contain the motor-driven pump, and electrically-operated hydraulic valves, for the purpose of operating the gripper mechanism. Electrical control wiring is carried through the steering tiller handle 49 to the turntable 18 and to the parts which are mounted on the chassis 11, and the electrical controls operate solenoid hydraulic valves in well known manner for controlling the various operations. The tiller handle 49 is pivotally connected by a shaft 50 to a bracket 51 extending from the underside of the turntable 18 which carries the wheel 19.

Figure 1:
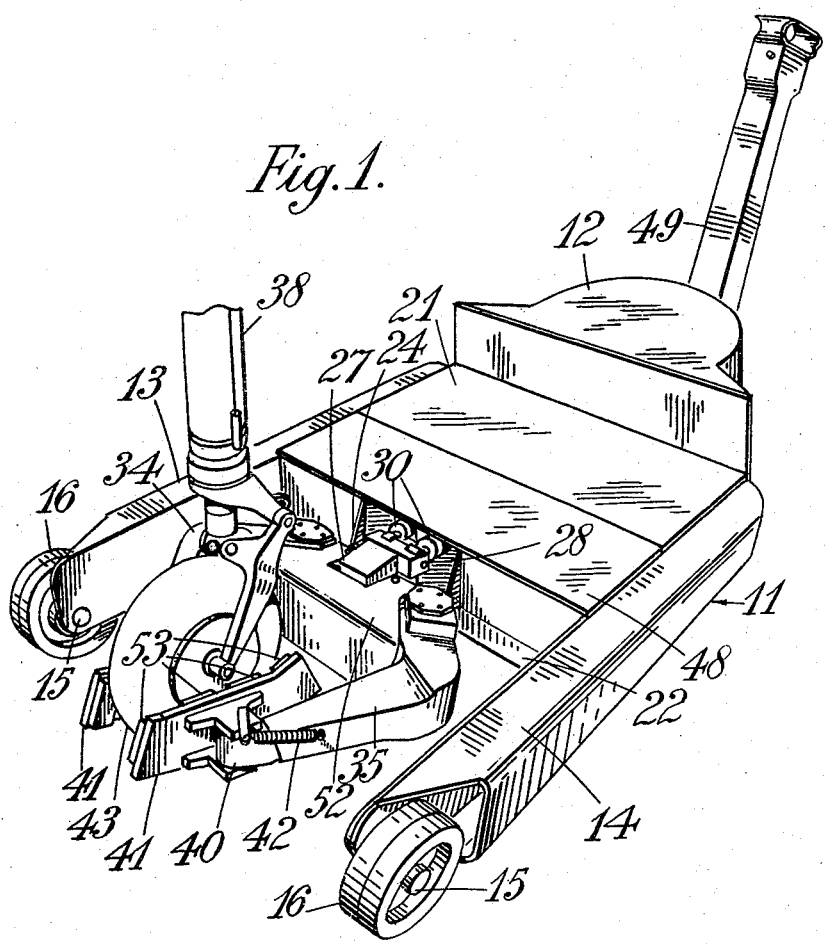
Figure 1 is a perspective view of a truck in accordance with the invention showing an aircraft undercarriage wheel being gripped.

In order to protect the jack 44 from accidental damage by coming into contact with aircraft wheels, as it is exposed to these in front of the machine, there is preferably arranged a guard 52 which is screwed to the upper side of the block 27 and extends forwardly and downwardly around the jack 44. The guard is seen in full lines in Figure 1 of the drawing and in chain line in Figure 2. Figure 4 is intended to show the advantage of the invention in the case, which is usual, of the undercarriage having a castoring or steering axis which is inclined. In this figure, the axis X—X is the axis of steering of the undercarriage wheels 63 in an undercarriage body 68, depending from a fuselage 67 of an aircraft. The truck 11 appears in end elevation after it has gripped the wheels 63 by grippers 41 and has been maneuvered into a position where the center line of the truck 11 is at right angles to the center line of the fuselage. The axis of the longitudinally disposed taper roller bearings 32 is indicated at Y in end-on view and intersects the axis X—X. It will be seen that lateral canting of the gripper arms about axis Y has enabled them to adapt themselves to the inclination of the axis X—X as the truck is maneuvered from a position such as is indicated in Figure 1 where the steering inclination X—X is in a plane parallel to the center line, to the position shown in Figure 4 where it is at right angles thereto.

I claim:

1. An aircraft handling device comprising a chassis, lateral ground wheels at one end of the chassis, means for maneuvering the chassis over the ground, a gripper-arm support on the chassis, gripper arms extending forwardly from the support side by side close to the ground, the forward portions of the gripper arms lying between the ground wheels so that the ground wheel axis passes across them, gripper pads pivoted on said arms at approximately the position of said ground wheel axis so as to cause them to bear evenly on a part of an aircraft undercarriage when they engage it, means to draw the arms firmly together, means to move the gripper-arm support to lift the gripper arms, and spring means to bias the pad members to a position in which when not engaging an undercarriage part they diverge toward the front of the chassis.

2. An aircraft handling device comprising a chassis, lateral ground wheels at one end of the chassis, means for maneuvering the chassis over the ground, a gripper-arm support block pivoted on a horizontal axis behind the ground wheel axis, gripper arms pivoted on the support and extending forwardly therefrom side by side, means to draw the gripper arms together, undercarriage engaging grippers on the front ends of the gripper arms between the ground wheels, and hydraulic means for tilting the support block to raise the gripper arms.

3. An aircraft handling device comprising a chassis, lateral ground wheels at one end of the chassis, between the ground wheels a device for gripping the undercarriage comprising two arms extending forwardly from the chassis close to the ground with grippers at their front ends, means to draw the arms together, means to lift the arms bodily with the wheel and a means to allow the arms to cant about an axis which extends fore and aft of the truck, so that if the truck is moved on the ground around the undercarriage, the gripper arms can adapt themselves to any inclination of the steering axis of the undercarriage.

4. An aircraft handling device comprising a chassis, lateral ground wheels at one end of the chassis, undercarriage lifting means between said grounnd wheels and a pivotal mounting for the lifting means constructed and arranged for permitting the same to cant about an axis extending fore and aft of the truck, so that when the truck is turned around on the ground the lifting means can adapt themselves to any inclination of the column of an undercarriage.

References Cited in the file of this patent

UNITED STATES PATENTS

| | | |
|---|---|---|
| 2,252,534 | Trotter | Aug. 12, 1941 |
| 2,287,955 | Zunino | June 30, 1942 |
| 2,362,991 | Dahl | Nov. 21, 1944 |
| 2,706,061 | Ehmann | Apr. 12, 1955 |
| 2,732,088 | Arnot | Jan. 24, 1956 |
| 2,739,009 | Phillips | Mar. 20, 1956 |
| 2,752,054 | Thompson | June 26, 1956 |